United States Patent
Azevedo et al.

(10) Patent No.: US 10,841,379 B2
(45) Date of Patent: Nov. 17, 2020

(54) SYSTEMS AND METHODS FOR ENVIRONMENTAL MANAGEMENT IN A NETWORK OF MOVING THINGS

(71) Applicant: Veniam, Inc., Mountain View, CA (US)

(72) Inventors: Joao Azevedo, Oporto (PT); Andre Cardote, Aveiro (PT)

(73) Assignee: Veniam, Inc., Mountain View, CA (US)

( * ) Notice: Subject to any disclaimer, the term of this patent is extended or adjusted under 35 U.S.C. 154(b) by 28 days.

(21) Appl. No.: 15/228,613

(22) Filed: Aug. 4, 2016

(65) Prior Publication Data

US 2017/0086230 A1    Mar. 23, 2017

Related U.S. Application Data

(60) Provisional application No. 62/222,186, filed on Sep. 22, 2015.

(51) Int. Cl.
| | |
|---|---|
| H04L 12/801 | (2013.01) |
| H04L 12/24 | (2006.01) |
| H04L 5/14 | (2006.01) |
| H04L 29/08 | (2006.01) |
| H04W 4/38 | (2018.01) |
| H04W 88/10 | (2009.01) |
| H04W 84/18 | (2009.01) |

(52) U.S. Cl.
CPC .............. *H04L 67/12* (2013.01); *H04W 4/38* (2018.02); *H04W 84/18* (2013.01); *H04W 88/10* (2013.01)

(58) Field of Classification Search
CPC ........... H04W 4/46; H04W 4/40; H04W 4/48; H04W 4/44; H04W 4/38
See application file for complete search history.

(56) References Cited

U.S. PATENT DOCUMENTS

| | | | | |
|---|---|---|---|---|
| 2006/0217879 A1* | 9/2006 | Ikeuchi | ................ | G01C 21/32 701/409 |
| 2010/0063954 A1* | 3/2010 | Anderson | ............ | G05D 1/0221 706/50 |
| 2011/0279245 A1* | 11/2011 | Hynes | .................... | G06K 17/00 340/10.42 |
| 2013/0023229 A1* | 1/2013 | Messerly | ............... | G06Q 10/06 455/404.2 |
| 2013/0285855 A1* | 10/2013 | Dupray | .................. | G01S 19/48 342/451 |
| 2013/0332238 A1* | 12/2013 | Lyle | ....................... | G06Q 10/30 705/7.34 |
| 2014/0301289 A1* | 10/2014 | Johnsson | .......... | H04W 72/0413 370/329 |
| 2014/0361097 A1* | 12/2014 | McLain | ............... | A01B 79/005 239/11 |
| 2015/0294431 A1* | 10/2015 | Fiorucci | ................ | G07B 15/02 705/13 |

(Continued)

*Primary Examiner* — Faruk Hamza
*Assistant Examiner* — Abusayeed M Haque
(74) *Attorney, Agent, or Firm* — McAndrews, Held & Malloy, Ltd.

(57) ABSTRACT

Systems and methods for environmental management in a network of moving things. As non-limiting examples, various aspects of this disclosure provide systems and methods for integrating sensors, mobile access points, and/or the network of moving things with municipal waste management systems, pollution control systems, etc.

26 Claims, 14 Drawing Sheets

(56) References Cited

U.S. PATENT DOCUMENTS

| | | | |
|---|---|---|---|
| 2015/0307273 A1* | 10/2015 | Lyman | G01G 19/08 |
| | | | 705/7.13 |
| 2015/0319486 A1* | 11/2015 | Wang | H04N 21/2343 |
| | | | 725/62 |
| 2016/0034329 A1* | 2/2016 | Larson | G01D 21/02 |
| | | | 702/188 |
| 2016/0379179 A1* | 12/2016 | Roisen | H04W 4/024 |
| | | | 705/308 |
| 2017/0053554 A1* | 2/2017 | Nalepka | G09B 5/02 |
| 2017/0164274 A1* | 6/2017 | Petrescu | H04W 76/10 |
| 2017/0276480 A1* | 9/2017 | Hedley | G01S 5/0294 |
| 2019/0090174 A1 | 3/2019 | Rocci et al. | |

\* cited by examiner

SYSTEMS AND METHODS FOR ENVIRONMENTAL MANAGEMENT IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Application Ser. No. 62/222,186, titled "Systems and Methods for Environmental Management in a Network of Moving Things," filed on Sep. 22, 2015. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current environmental management systems are inefficient, for example failing to utilize sensor information available to them. As a non-limiting example, current municipal waste management systems, road maintenance systems, traffic management systems, etc., do not take full advantage of sensor technology integrated with the Internet of moving things. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
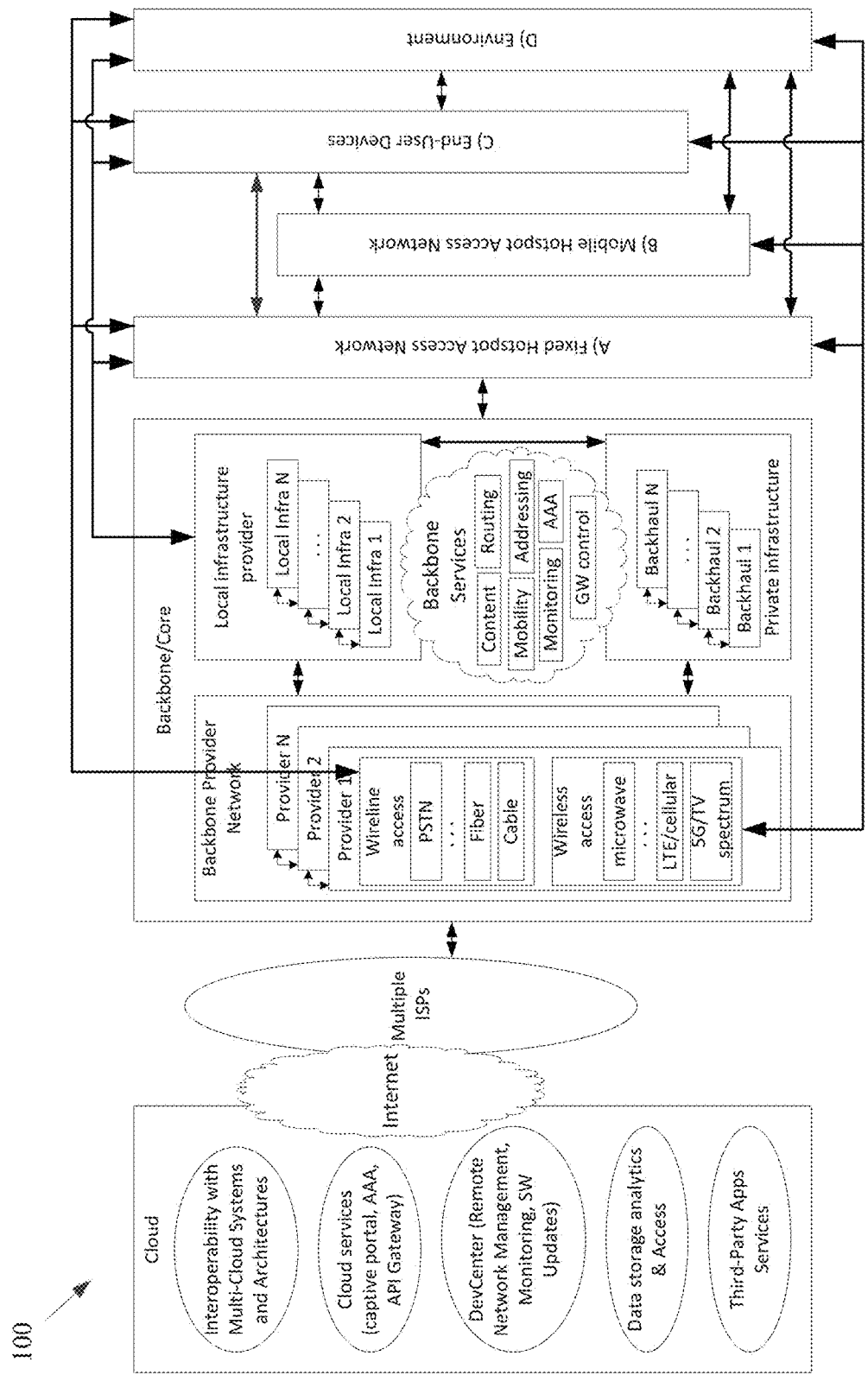
FIG. 1 shows a block diagram of a communication network, in accordance with various aspects of this disclosure.

Various aspects of this disclosure provide systems and methods for environmental management in a network of moving things. As non-limiting examples, various aspects of this disclosure provide systems and methods for integrating sensors, mobile access points, and/or the network of moving things with municipal waste management systems, pollution control systems, etc.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, nodes, networks, and/or network components 200, 300, 400, 500-570, 600, 700, 800, 900, 1000, 1100, and 1200, shown and/or discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
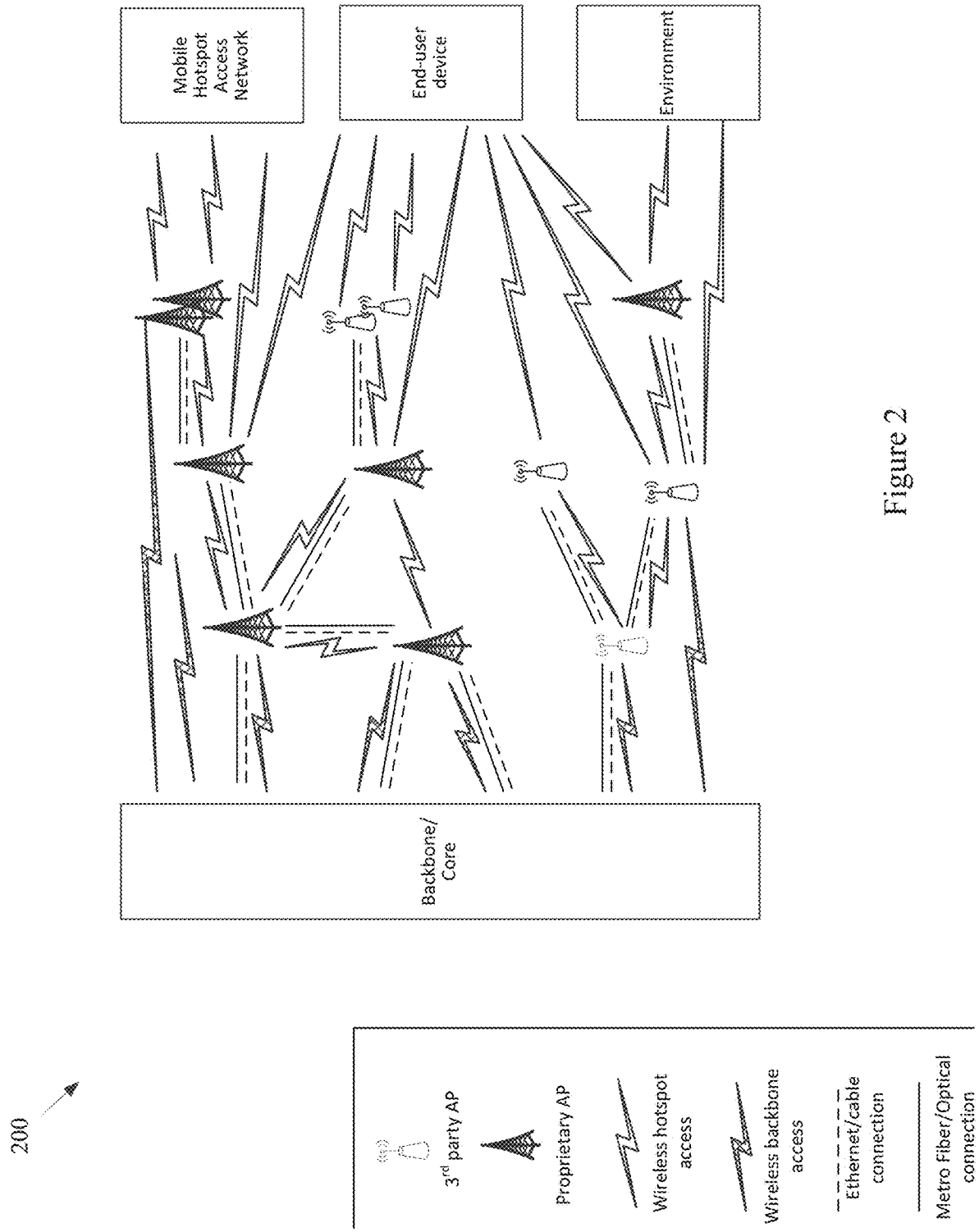
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, nodes, networks, and/or network components 100, 300, 400, 500-570, 600, 700, 800, 900, 1000, 1100, and 1200, shown and/or discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
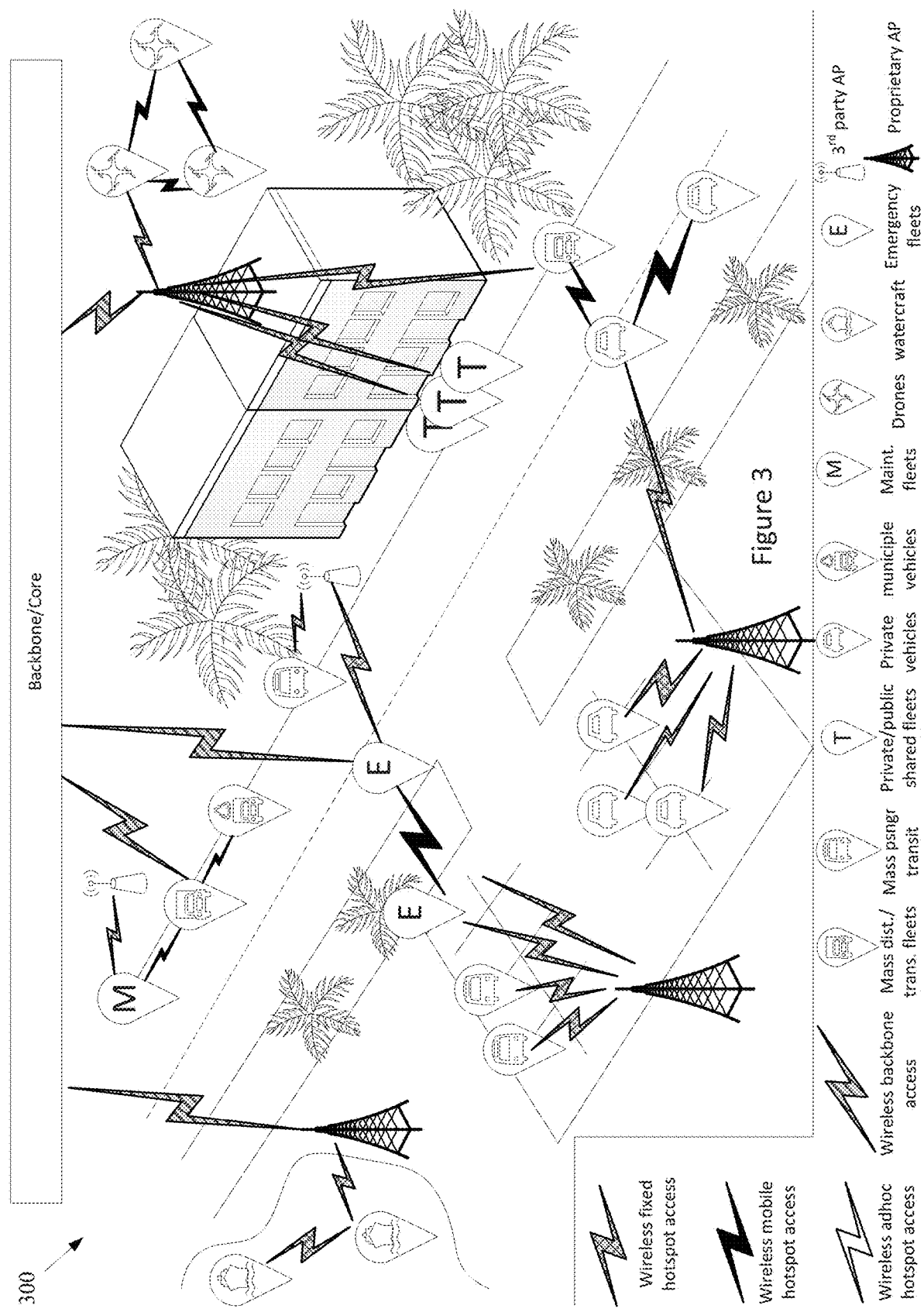
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, nodes, networks, and/or network components 100, 200, 400, 500-570, 600, 700, 800, 900, 1000, 1100, and 1200, shown and/or discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
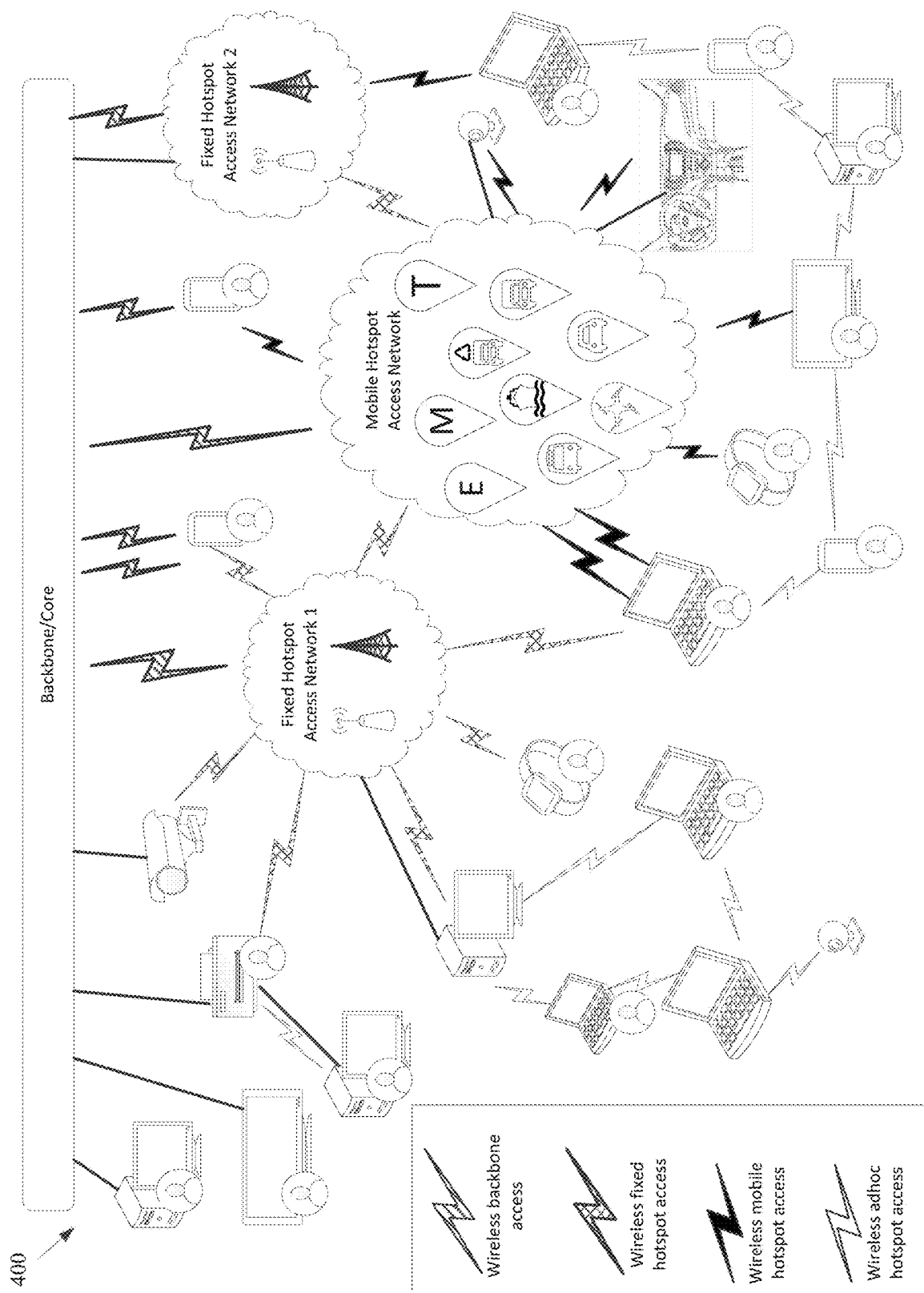
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, nodes, networks, and/or network components 100, 200, 300, 500-570, 600, 700, 800, 900, 1000, 1100, and 1200, shown and/or discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
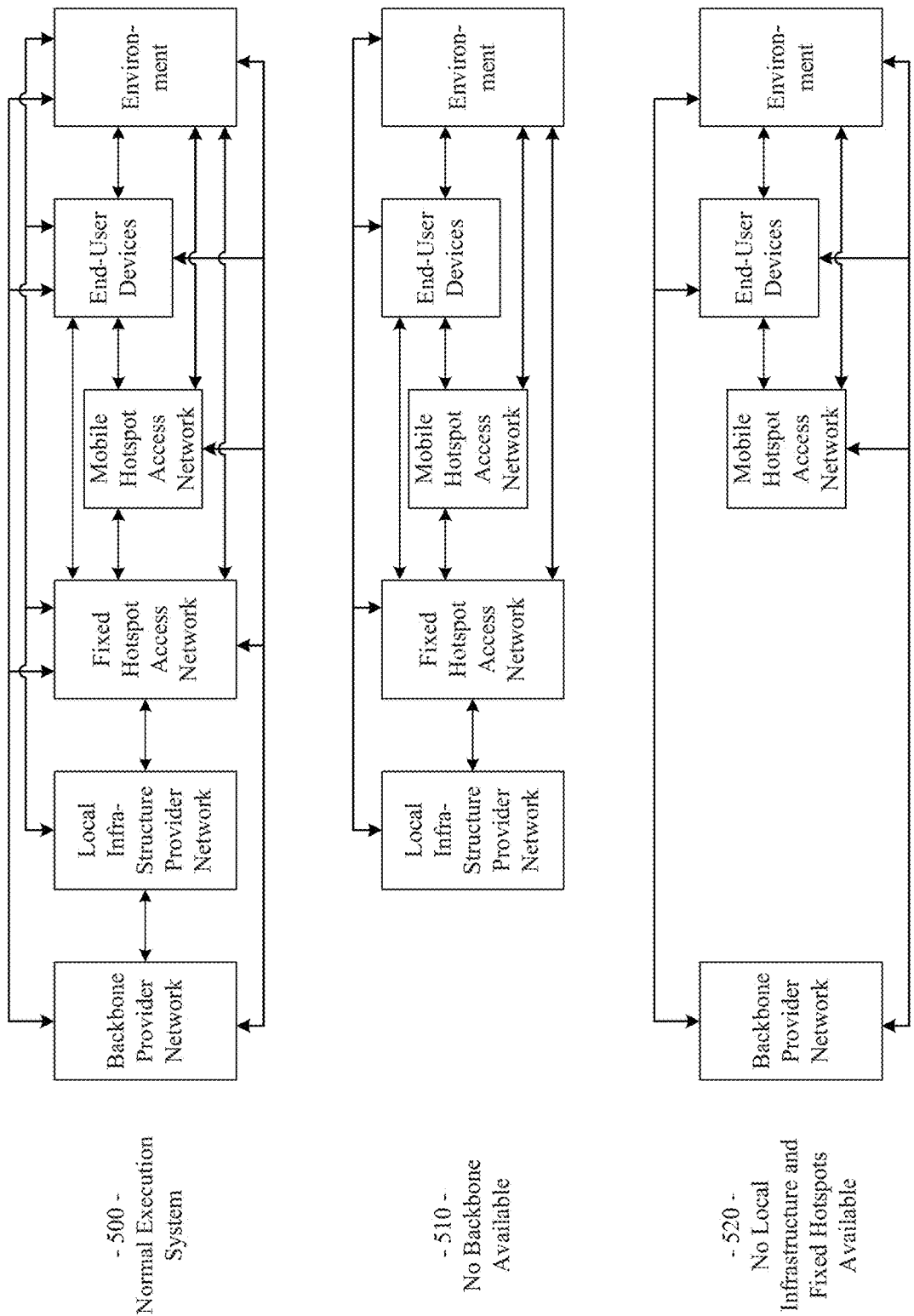
FIGS. 5A-5C show a plurality of network configurations illustrating the flexibility and/or and resiliency of a communication network, in accordance with various aspects of this disclosure.
Figure 5B:
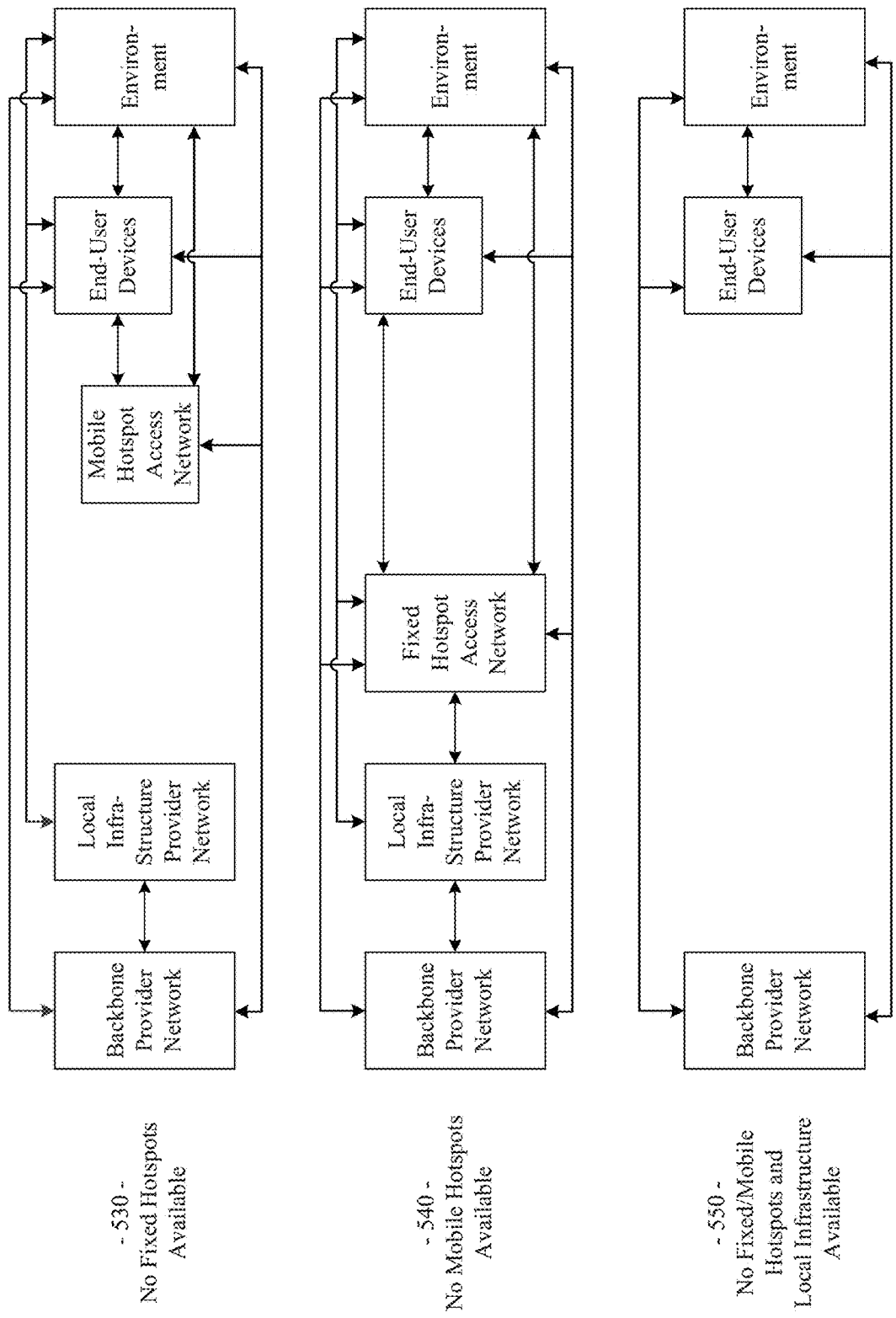
Figure 5C:
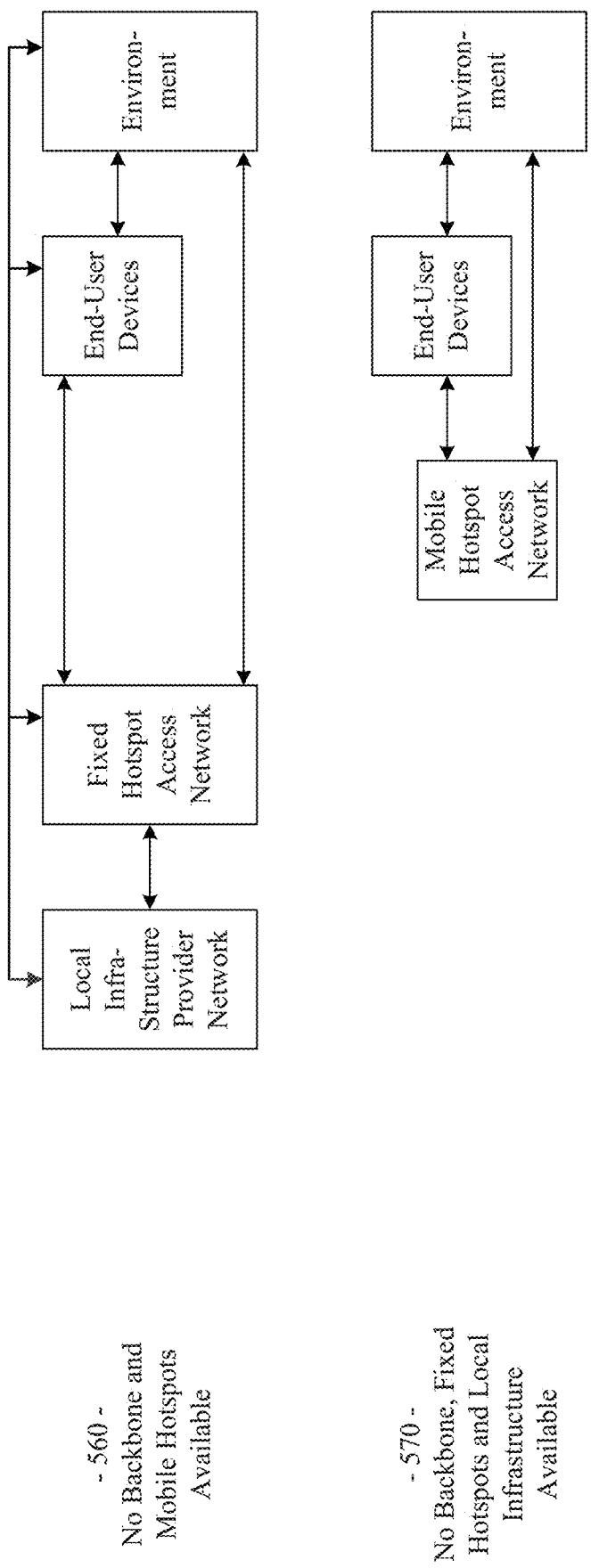

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, nodes, networks, and/or network components 100, 200, 300, 400, 600, 700, 800, 900, 1000, 1100, and 1200, shown and/or discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.).

For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
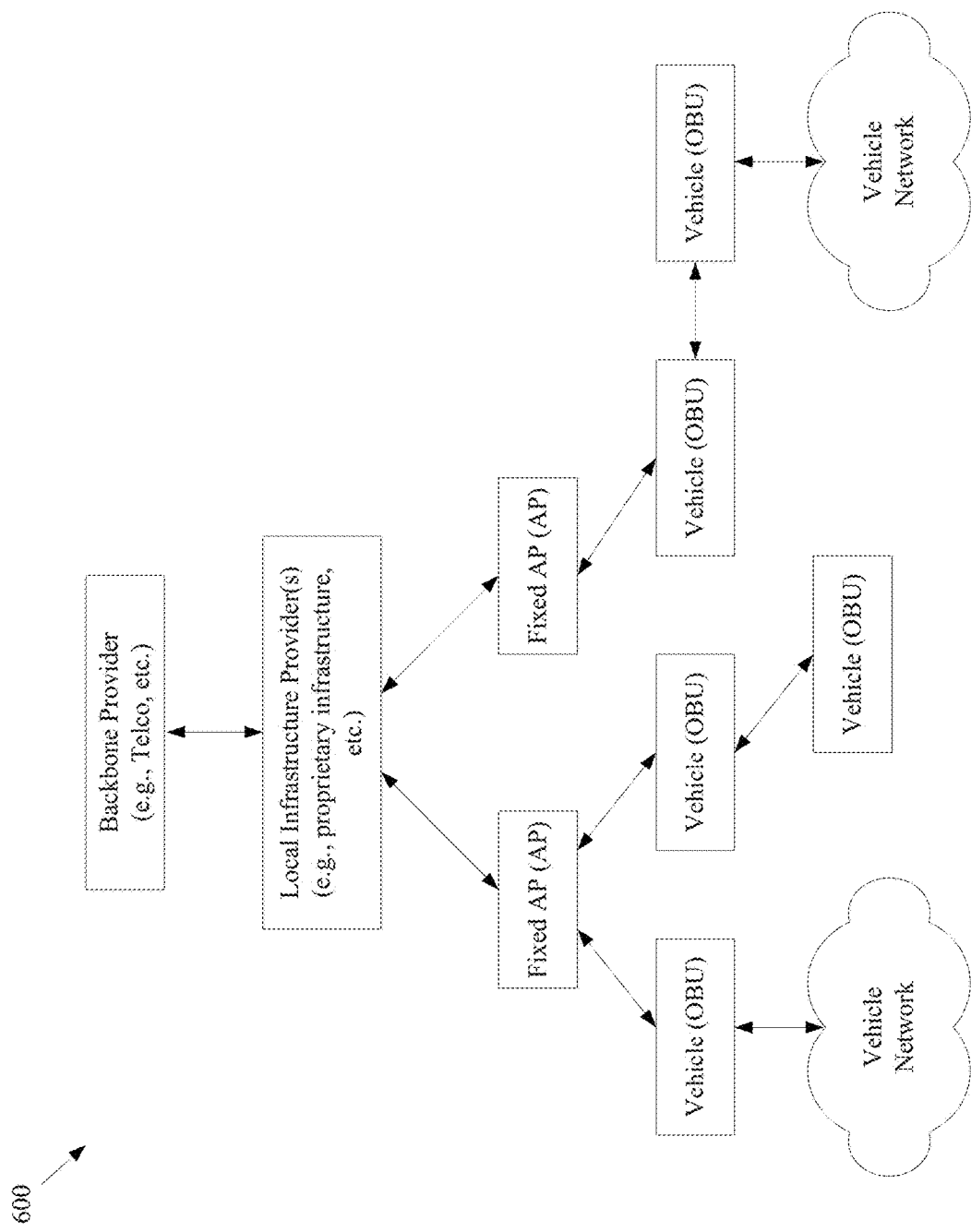
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, nodes, networks, and/or network components 100, 200, 300, 400, 500-570, 700, 800, 900, 1000, 1100, and 1200, shown and/or discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
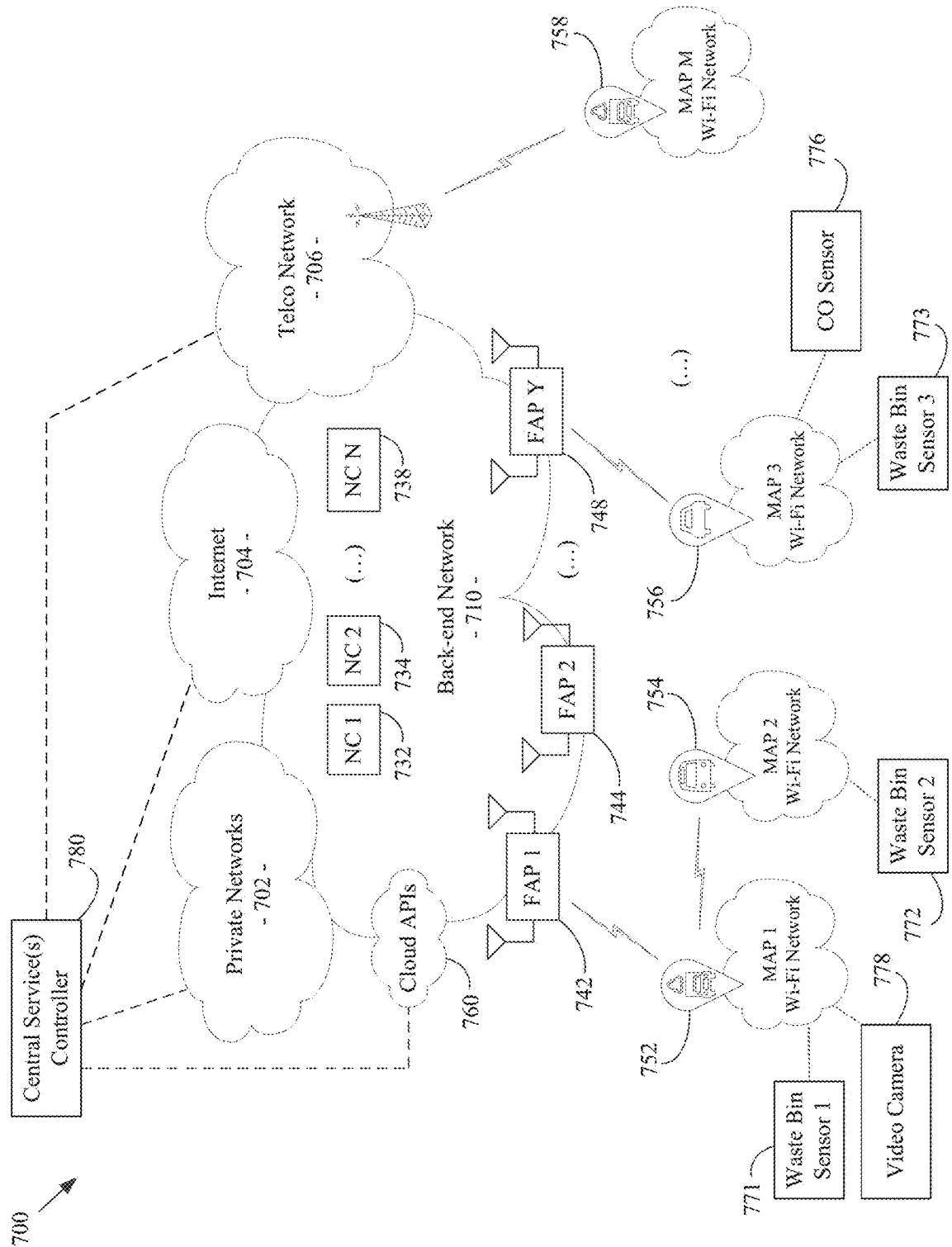
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, nodes, networks, and/or network components 100, 200, 300, 400, 500-570, 600, 800, 900, 1000, 1100, and 1200, shown and/or discussed herein. Notably, the example network 700 shows a plurality of vehicles (or Mobile APs, or OBUs), each communicatively coupled to a Fixed AP (or RSU), where each Mobile AP may provide network access to a vehicle network (e.g., comprising other vehicles or vehicle networks, user devices, sensor devices, etc.), for example a Wi-Fi network to which end user devices may connect, with which communication with sensors may be performed, with which communication with control circuitry may be performed, etc. The Mobile APs (or vehicles in which the Mobile APs are installed) may, for example, have access to information from any of a wide array of sensors (e.g., cameras, microphones, gas or particle sensors, weather sensors, impulse sensors or accelerometers, velocity sensors, slip detectors, temperature sensors, position or location sensors, moisture detectors, pressure sensors, weight sensors, door or lid sensors, etc.). The Mobile APs may, for example, gather (or collect) information from such sensors, make various autonomous decisions based at least in part on the gathered information, communicate such information to controllers (e.g., local controllers of vehicles, central controllers, etc.), etc. Many non-limiting examples of such operation are provided herein.

As shown in FIG. 7, a Central Services(s) Controller 780 (e.g., for a city, neighborhood, precinct, etc.) may be communicatively coupled to the network (e.g., to the cloud, to the infrastructure, etc.) in any of a variety of manners, for example, the Central Service(s) Controller 780 may be connected to a cloud of a network operator, for example a Back-end Network 710 (e.g., through APIs 760, via a Private Network 702, via the Internet 704, via a Telco Network 706, etc.).

Also as shown in FIG. 7, a vehicle network may be connected (e.g., communicatively coupled, directly or indirectly) to one or more local Waste Bin Sensors 771, 772, and 773, Video Cameras 778, CO Sensors 776, etc. The vehicle network may, for example, comprise any or all of the nodes discussed herein. For example, the vehicle network may comprise one or more Network Controllers (NCs) (e.g., NC 1 732, NC 2 734, . . . , NC N 738, etc.), one or more Fixed APs (e.g., FAP 1 742, FAP 2 744, . . . , FAP Y 748, etc.), one or more Mobile APs (e.g., MAP 1 752, MAP 2 754, MAP 3 756, . . . , MAP M 758, etc.). Such nodes may, for example, be communicatively coupled in any of the manners discussed herein.

In a communication network constructed in accordance with various aspects of the present disclosure, a citywide network of sensors may be utilized to understand city dynamics in ways that were previously not possible or practical. Information gathered from city sensing can be very useful when making decisions that affect how a city works. Such information provides a way to plan or schedule the utilization of municipal resources based on historical data and also a way to deviate from planned operation in response to detected real-time conditions (e.g., unexpected conditions, etc.). Additionally, access to such data improves awareness of city problems that may otherwise go unnoticed and/or unnoticed for an unacceptably long period of time.

In accordance with various aspects of the present disclosure, information retrieved from sensors and communicated over the network of moving things is utilized to manage and optimize operations of the various services provided to citizens, for example waste (or garbage) collection services, road maintenance services, public transportation services, police services, car-free areas, traffic control services. Additionally for example, data gathered from smart meters, like water meters or electricity meters and communicated over the network of moving things may be provided to utility companies, for example for optimizing load balancing, operating smart grids, etc. Further for example, information from structural health sensors, water leakage sensors, and the like, may be collected and communicated over the network of moving things and, for example, utilized to schedule, in advance, maintenance actions in city or industrial infrastructures preventing outages or forced building shutdowns.

In accordance with various aspects of the present disclosure, a network of moving things is utilized to collect (or harvest) data from multiple types of sensors scattered around the city, placed aboard vehicles, embedded within user handheld devices and/or clothing, etc. The network of moving things may, for example, deliver the collected sensor data to the Cloud in a reliable and affordable manner, providing for massive sensor data collections. The network of moving things is thus able to provide valuable data about the city status and its dynamics to the citizens and management committees, integrating a variety of types of data learning and analytics approaches.

In accordance with various aspects of the present disclosure, the network of moving things provides for storage of the gathered data and provides for access to the gathered data. For example, access to the gathered data is provided at high levels of the network of moving things (e.g., at the Cloud, at the infrastructure level, etc.) and/or at the low levels of the network (e.g., at the Mobile APs, at the Fixed APs, etc.).

In an example implementation, an extensive set of low-cost low-power (e.g., battery operated, solar operated, wind operated, etc.) sensors are positioned throughout a city at an agency's points of interest. Such sensors are able to communicate with access points (e.g., Mobile APs, Fixed APs, etc.) of the network of moving things, for example utilizing Wi-Fi or other wireless LAN technology, personal area networking technology, inter-vehicle communication technology, etc. Additionally, such sensors may operate to communicate in accordance with any of a variety of communication protocols that have been developed for low-power communication (e.g., the CoAP protocol, etc.). If battery powered, sensors are generally operable in various low-power modes, in which the sensors may be wakened as needed (e.g., wakened by a passing Mobile AP, waked by a timer, etc.) to gather and/or communicate sensor data.

In accordance with various aspects of the present of disclosure, as vehicles of the network of moving things (e.g., the Internet of Moving Things) go about their general duties (e.g., as buses, as waste collecting vehicles, as road repair vehicles, as mail delivery vehicles, as emergency services vehicles, etc.), such vehicles (e.g., Mobile APs or OBUs thereof) may operate to interact with sensors. Such sensors may, for example, directly concern operation of the respective vehicle, but in general, such sensors might have nothing to do with the operation of the vehicle gathering the sensor data. For example, a passing bus may collect sensor information concerning the fullness of waste containers, the position of road maintenance vehicles or workers, electrical usage of a building, etc.

The collected data may, for example, be temporarily stored in the vehicle (e.g., in a memory of or attached to the Mobile AP, etc.). In various example scenarios, the collected data may also be processed onboard the vehicle, for example to calculate metrics, to summarize the data, to compress the data, etc. In such scenarios, the collected data and/or information characterizing the collected data may be immediately delivered to the Cloud or may be delivered to the Cloud in a delay-tolerant manner (e.g., to reduce communication costs, etc.).

Once the retrieved sensor data and/or metrics reach the Cloud, such data may be provided to users in a raw format or processed to enhance usefulness. For example, a suite of APIs may be provided in the Cloud that provides convenient access to the gathered data and/or metrics for client (or controller) analysis. Additionally, in an example scenario, sensor data may also be delivered at the user level (e.g., sensor data regarding weather conditions, sensor data regarding operation of the vehicle, data associated with any of a variety of sensors on-board the vehicle, etc.).

Any of a variety of types of analysis may be performed on the gathered data, for example, to improve the services offered by organizations and individuals. Various non-limiting example scenarios involving waste management are presented herein. It should be understood that the scope of this disclosure is not limited by characteristics of the example waste management scenarios or of any examples presented herein.

In an example scenario, an enterprise or government organization collecting waste (or garbage) in a city can optimize routes based on the average garbage levels in the cans at the time of garbage collection. The average (or expected) levels may, for example, be determined based on historical usage data gathered from garbage sensors over time. Note that even in a scenario in which an optimal waste (or garbage) collection plan is implemented, real-time data of garbage levels may also be considered to adjust such collection plan.

Figure 8:
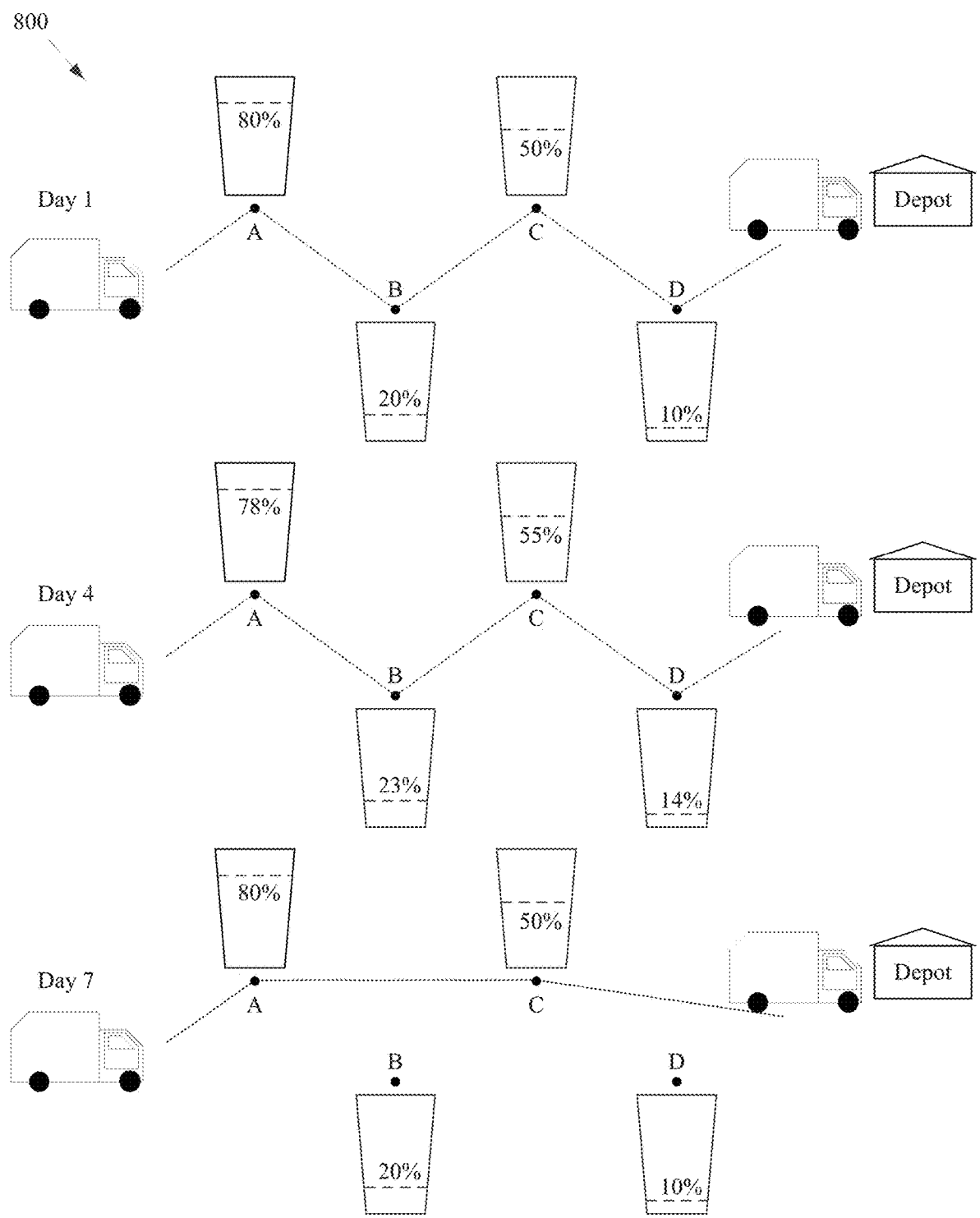
FIG. 8 shows a block diagram of an example waste management scenario, in accordance with various aspects of the present disclosure.

Turning next to FIG. 8, such figure shows a block diagram of an example waste management scenario, in accordance with various aspects of the present disclosure. The example scenario 800 may, for example, be implemented in a network and/or network component that shares any or all characteristics with the other example methods, nodes, networks, and/or network components 100, 200, 300, 400, 500-570, 600, 700, 900, 1000, 1100, and 1200, shown and/or discussed herein.

On day 1 the garbage collection truck approaches each of the garbage cans and collects the data from one or more respective sensors installed in each garbage can. This may, for example, occur during garbage collection and/or driving by without performing garbage collection. During this activity, the system gets an overview of the garbage level in the cans. Note that as explained herein, any of a variety of types of vehicles may collect the sensor information (e.g., buses, road crew vehicles, police vehicles, firefighter vehicles, trains, postal delivery workers, commercial delivery trucks, private vehicles, flying drones, etc.).

After repeating the data collection for many days, including day 4, the garbage collection plan (or routes) manager (e.g., a networked Central Service(s) Controller, a service controller on-board a vehicle or Mobile AP, etc.) can analyze the data to optimize the garbage collection plan (or routes). In the example scenario shown in FIG. 8, trash cans B and D do not need to be emptied every day (or every pick-up day). Over time, a route optimization (or collection plan) is developed. On some days, trash cans B and D will be emptied, but on other days, trash cans B and D will be skipped, which is illustrated on the Day 7 collection route, in which the collection truck only services trash cans A and C.

Note that the collection routes may continually change as data is gathered over time. For example, if trash can B starts to see more use over time, then trash can B may be added to the "every day collection" category. Also note that if a vehicle (e.g., a bus, maintenance vehicle, patrol vehicle, etc.) drives by trash can B on Day 7 before the collection truck nears trash can B and determines based on a sensor of trash can B that such can is full, and such information is propagated to a management entity (e.g., a networked Central Service(s) Controller, a local service controller of the collection truck, etc.), and the predetermined collection route for the truck on that day (or the next) may be altered to collect from trash can B. For example, collected sensor data may be utilized to modify a waste collection plan (or any other service providing plan) in real-time. For example, in an example waste collection scenario, the amount of waste detected for collection may be analyzed to determine whether a real-time modification to a previously formed waste collection plan is necessary, and/or for example whether a next collection plan (e.g., for a following day or shift or route) may be formed in light of the amount of waste detected. Note that a strong historical utilization of a trash can may generally result in the bin being included in the waste collection plan regardless of present sensor indications. Note also that as waste is collected, the amount of waste collected may be monitored (e.g., weighed, viewed, etc.) by the collector and thus provide an indication as to whether a waste sensor is performing properly. Also for example, communication with the sensor may include communication regarding power source conditions, operational health, etc., for example to determine whether battery replacement and/or sensor replacement should be scheduled.

In another example scenario, information regarding the fullness of trash can B may be propagated throughout the network of moving things and/or directly passed to collection trucks within a region (e.g., through the vehicle communication network, etc.). In such scenario, a collection truck (e.g., via human interaction, via an adaptable routing algorithm on board the truck, etc.) may autonomously determine to drive to and empty trash can B. For example, a bus (or Mobile AP thereof) having just collected sensor data from trash can B may pass with range of the collection truck and communicate the sensor data directly to the collection truck. Also for example, the bus (or Mobile AP thereof) may pass such information to a Fixed AP and/or other Mobile AP, which may then pass such information to all collection trucks within a geographical area, for example in addition to and/or instead of propagating such information to the Cloud.

If the information regarding an unexpectedly full trash can (or dumpster, etc.) arrives to the management entity (e.g., a networked Central Service(s) Controller system, a service controller on-board a service vehicle or Mobile AP thereof, etc.) too late for practical adjustment to the current day's collection route (or plan), the next day's route may be formed (or modified if necessary) to include servicing trash can B.

A network of moving things, in accordance with various aspects of the present disclosure, provides a diverse set of organizations the opportunity to participate in and/or benefit from the network of moving things. For example, as discussed herein, the Cloud (e.g., a database, a Central Service(s) Controller server, etc.) collects the sensor data, stores the sensor data, and provides access to the data (e.g., through APIs) to the organizations (or systems or servers thereof) having interest in the data. Also for example, the Cloud may comprise data processing algorithms as desired that may also analyze the collected data, for example calculating various metrics that are readily accessible to the organizations. Note that such access may be restricted in accordance with the security needs of the organizations. Accordingly, governments, citizens, service organizations, ports, municipalities, etc. may all develop a better understanding of the problems to be managed and/or the services to be provided.

As more and more data is collected and stored, smart algorithms, for example based on machine learning techniques, may be utilized to build predictive models of the city dynamics, for example waste collection routes or plans, traffic flows, citizens' routes or garbage production, etc., allowing for the efficient utilization of resources. For example, the collected sensor data may be analyzed to determine or infer the trends/demands for new residential/business areas, for growing residential/business areas, etc. Also for example, the provisioning of services may be optimized to make the most of available resources (e.g., human resources, machine resources, monetary resources, etc.). Additionally for example, with a relatively large set of data (e.g., statistical sample size), such data may be analyzed to reliably predict need, but may also be analyzed to detect anomalies that are in need of further investigation. For example, the detection of a statistically unlikely event (e.g., a value unexpectedly above a particular threshold or statistical control number, an unlikely trend in the data, etc.) may trigger an investigation.

As discussed herein, different types of sensor data may have different respective reporting or analysis priorities. Priority may also be a function of time-of-day and/or day-of-week, a function of the data itself (e.g., data indicating an emergency condition, data indicating an unexpected environmental condition, etc.), a function of a user input from the Cloud indicating that a particular type of data is presently high-priority data, etc. Thus, in accordance with various aspects of this disclosure, the manner in which the collected data is communicated to the Cloud (or to the client directly) through the network of moving things is adaptable. For example as discussed elsewhere herein, delay-tolerant data may be propagated through the network as convenient and economically prudent, but real-time critical data may be propagated through the network via a fastest and/or most reliable path (e.g., via a cellular path, via a fastest infrastructure path, via multiple paths for redundancy, etc.). The network of moving things is capable of providing these options.

The manner in which the sensor data is processed and/or the equipment performing the processing may also adapt based on time constraints. For example, when the processing of particular data (e.g., waste collection data) is not relatively urgent, such processing may be performed in the Cloud at some point after the collected data is accumulated.

Also for example, when the processing of particular data is real-time critical (e.g., for immediate traffic congestion management, for handling a potential emergency situation, for an emergency waste clean-up situation, etc.), the analyzing of such data may be performed in the network closer to the source (e.g., at a Mobile AP, at a computer that is part of the network of a vehicle, at a Network Controller, etc.).

As discussed herein, the security, integrity and privacy of the collected data may be a concern. Accordingly, the various levels of the network of moving things comprise respective security measures (e.g., token-based authentication for API access, Datagram Transport Layer Security (DTLS) functionality for communication between sensors and vehicles, general cryptographic capability, etc.).

Figure 9:
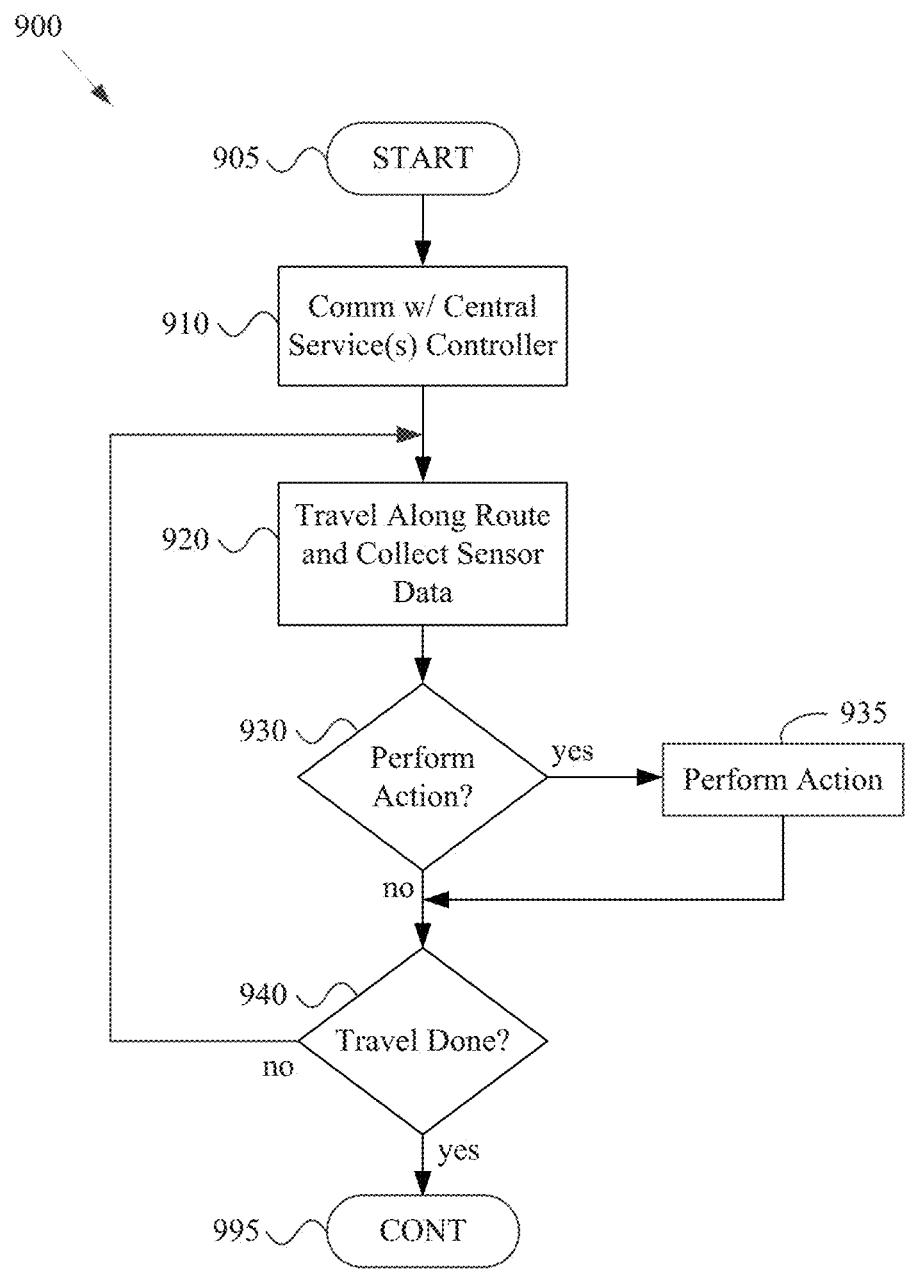
FIG. 9 shows a flow diagram of an example method of managing environmental services, in accordance with various aspects of the present disclosure.

FIG. 9 shows a flow diagram of an example method 900 of managing environmental services (e.g., municipal services, campus services, port services, etc.), in accordance with various aspects of the present disclosure. The example method 900 may, for example, share any or all characteristics with the other example methods, nodes, networks, and/or network components 100, 200, 300, 400, 500-570, 600, 700, 800, 1000, 1100, and 1200, shown and/or discussed herein. The example method 900, or any portion thereof, may for example be implemented in a Mobile AP or a plurality thereof. Also for example, the example method 900 or any portion thereof may, for example, be implemented in a Fixed AP, Network Controller, Central Service(s) Controller, any node discussed herein, etc.

The example method 900 begins executing at block 905. The example method 900 may begin executing in response to any of a variety of causes or conditions, non-limiting examples of which are provided herein. For example, the example method 900 may begin executing in response to a user command to begin, in response to a signal received from a network node (e.g., from a networked database, from a Central Service(s) Controller, from a local service controller of a vehicle or MAP thereof, from a networked client dashboard, etc.), in response to a detected environmental or municipal service condition (e.g., a waste collection condition, a road service condition, an air quality condition, etc.), in response to a detected emergency condition, in response to a timer, in response to a power-up (or turn on or reset) event at the system implementing any or all aspects of the example method 900, etc.

At block 910, the example method 900 comprises communicating with a Central Service(s) Controller regarding one or more services being provided (e.g., waste management services, road repair services, collection and/or delivery purposes, transportation services, etc.) or related conditions. Such communication may comprise any of a variety of characteristics. For example, block 910 may comprise receiving information from the Central Service(s) Controller concerning how the Mobile AP is to conduct its data collection activities (e.g., data collection control information). For example, such information may comprise information concerning sensors with which the Mobile AP is to communicate to obtain sensor information (e.g., sensor geographical location, sensor network address, sensor type, etc.). Also for example, such information may comprise information identifying when the Mobile AP is to collect (or gather) data from various sensors. Additionally, for example, such information may comprise information regarding the manner in which the Mobile AP is to communicate collected data to the Central Service(s) Controller (or database(s) accessed thereby). For example, such information may indicate whether data collected from a sensor is to be communicated immediately (e.g., via a cellular communication network, via the vehicle communication network, etc.), whether the data is to be communicated within a particular amount of time (e.g., within a number of seconds, within a number of minutes, etc.), whether the data has a higher priority than other data, etc. Note that the communication of block 910 may be performed at any time throughout execution of the example method.

The information received from the Central Service(s) Controller may also, for example, comprise service providing command information. A Central Service(s) Controller may, for example, communicate control commands to local service providing vehicles (or Mobile APs thereof), for example to a waste collection vehicle, a road service vehicle, etc. Such commands may, for example, be originated by the Central Service(s) Controller and communicated through one or more Mobile APs and/or Fixed APs. In an example scenario, a Central Service(s) Controller may communicate a "collect" command through a Mobile AP that is within communication range of a waste collection vehicle (or Mobile AP thereof) capable of implementing the "collect." In another example scenario, the Central Service(s) Controller may communicate a "no collect" command for a particular waste collection vehicle to the vehicle communication network, which then has the responsibility to propagate the command to the particular waste collection vehicle through one or access points (e.g., FAPs, MAPs, etc.) that are geographically close to the particular waste collection vehicle.

In general, block 910 may comprise the Mobile AP communicating with a Central Service(s) Controller regarding service control. Accordingly, the scope of this disclosure should not be limited by characteristics of any particular manner of such communicating, of any particular type of information related to service control, etc.

At block 920, the example method 900 may comprise the Mobile AP collecting sensor data as the Mobile AP (or vehicle carrying the Mobile AP) travels along a route. Note that the route may be predefined (e.g., a bus route, mail collection route, etc.), partially defined (e.g., a police patrol beat, etc.), generally random, etc. In an example scenario, the Mobile AP (or vehicle or operator thereof) may have received route information (e.g., a waste collection plan, etc.) at block 910.

As the Mobile AP travels along the route, the Mobile AP may operate to collect sensor data from sensors along the route. Some or all of the sensors may, for example, have been identified at block 910. In an example scenario, at block 910 the Mobile AP may have received a list of secure sensors from which the Mobile AP is to collect data, where the list includes geographical locations of the sensors, security codes for the sensors, operation characteristics (e.g., sleep mode characteristics, communication protocol characteristics, etc.) for the sensors, instructions for how to handle data gathered from the sensors, etc. Note that the Mobile AP may operate to collect data from a wide variety of different types of sensors, each of which may be associated with a different respective type of service. As a Mobile AP gathers data from one or more sensors, execution of the example method 900 may flow to block 930. Note that block 920 may comprise the Mobile AP collecting data directly from the sensor(s), but may also comprise collecting the data (or related information) by receiving the data from another node (e.g., another Mobile AP that has collected the data, any other node of the communication networks discussed herein, from a Central Service(s) Controller, etc.).

At block 930, the example method 900 may comprise determining whether the Mobile AP is to perform one or more actions related to the collected data. Such actions comprise any of a variety of characteristics. For example, a first example action may comprise the Mobile AP communicating the collected data to a Cloud-based database, to a Cloud-based Central Service(s) Controller, to a particular networked client system, to one or more other Mobile APs (e.g., directly or through the vehicle communication network, etc.), to a fleet of Mobile APs corresponding to a particular service, to a service provider module on-board the Mobile AP or corresponding vehicle, etc.

In an example scenario, the Mobile AP may analyze the collected sensor data to determine a manner in which to communicate the collected sensor data (or information generally related to the collected sensor data). For example, the Mobile AP may compare the collected sensor data to a threshold value to determine whether the Mobile AP should immediately communicate information related to the collected data (e.g., through a cellular communication network, through the vehicle communication network, etc.), whether the Mobile AP should communicate information related to the collected data to a destination relatively soon but with no real-time constraints (e.g., opportunistically through the vehicle communication network, in a delay-tolerant manner, etc.), whether the Mobile AP should wait until the end of a shift (or route) to communicate the information (e.g., when the vehicle of the Mobile AP has return to a hub or dispatch center, etc.), etc. In an example scenario, the Mobile AP may have been informed (e.g., at block 910, etc.) of the manner in which communication of information related to the collected sensor data is to be performed. Note that determining the manner in which information related to collected sensor data (e.g., raw sensor data, summarized sensor data, compressed sensor data, etc.) is communicated may depend, at least in part, on the value of the data. For example, the condition sensed by the sensor may determine the urgency with which information related to the collected sensor data is communicated.

A second example action may, for example, comprise the Mobile AP (or other system of the vehicle carrying the Mobile AP) analyzing the data to determine whether a service plan (e.g., a waste collection plan, a road repair plan, etc.) of the vehicle carrying the Mobile AP (or other vehicle) should be modified. In an example scenario, the Mobile AP may be carried by a vehicle that is providing a service to which the collected sensor is related. For example, the Mobile AP may be carried by a waste collection vehicle. The Mobile AP, having received the sensor data (or information related to the sensor data), may analyze such data (or information) to determine whether the present service providing plan guiding operation of the vehicle (and crew thereof) should be modified. For example, as discussed herein, an unexpected situation (e.g., a waste bin that is unexpectedly in need of urgent service) may arise while the vehicle is performing its service-providing duty according to a predefined service providing plan (e.g., which may have been received at block 910). In response to information related to sensor data indicating that the waste bin is urgently in need of servicing, the Mobile AP may determine that the service providing plan should be altered. Such a decision may, for example, be based at least in part on the sensor data level (e.g., relative to a threshold, analyzed in light of statistical expectations (e.g., averages, standard deviations or variances, etc.), time-of-day, day-of-week, geographical location, the location of the waste bin relative to the vehicle and/or the vehicle's planned route (e.g., whether the location has already been passed, whether the location has yet to be passed etc.), etc.

Other example actions that may be taken by the Mobile AP may, for example, comprise alerting a user (e.g., a driver or controller of a vehicle, a dispatcher, etc.) of a detected environmental condition, communicating to the sensor (and/or a customer associated with the sensor) that the sensor data has been received and/or successfully reported, etc.

As mentioned herein, information received by the Mobile AP at block 910 may comprise information governing actions that the Mobile AP is to take with collected data. Such information may, for example, identify the criteria that must be met (e.g., sensor data level, time constraints, etc.) for any particular action to take, the manner in which an action is to be performed, the degree of autonomy that the Mobile AP has with regard to decision-making (e.g., whether the Mobile AP is completely free to make its own decisions, whether the Mobile AP must ask for permission for a proposed action from a Central Service(s) Provider before acting, whether the Mobile AP may act autonomously only when received information (e.g., sensor data, etc.) meets certain criteria, only when a vehicle operator indicates human approval of a proposed action, etc.

In general, block 930 may comprise determining whether the Mobile AP is to perform one or more actions related to the gathered data. Accordingly, the scope of the present disclosure is not limited by characteristics of any particular action, manner of determining whether to perform an action, etc.

At block 935, the example method 900 comprises performing the action(s) identified at block 930.

At block 940, the example method 900 comprises determining whether the vehicle's travel is complete. For example, block 940 may comprise determining whether a waste collection route (or plan) has been completed, whether a road maintenance schedule for the day has been completed, whether a postal delivery route has been completed, whether a bus route has been completed, etc. If not, then execution of the example method 900 flows back up to block 920 (or any block of the example method 900, any method step discussed herein, etc.) for continued traveling, sensor data collecting, etc. If so, then execution of the example method 900 flows to block 995 for continued operation.

At block 995, the continued operation may comprise performing any of a variety of activities. For example, as discussed herein, particular types of information related to collected sensor data may be delay tolerant enough to communicate such information at the end of a route. For example, as a vehicle returns to a dispatch center (or hub) at the end of a travel or shift, block 995 may comprise communicating any or all of the information discussed herein via a wireless communication network of the dispatch center. Such operation may, for example, refrain from unnecessarily utilizing communication bandwidth of the vehicle communication network. Also for example, block 995 may comprise performing continued analysis of data, communicating with other Mobile APs regarding the data collection activity or any other matter, upgrading software, forming and/or downloading service plans for a next shift, etc.

Figure 10:
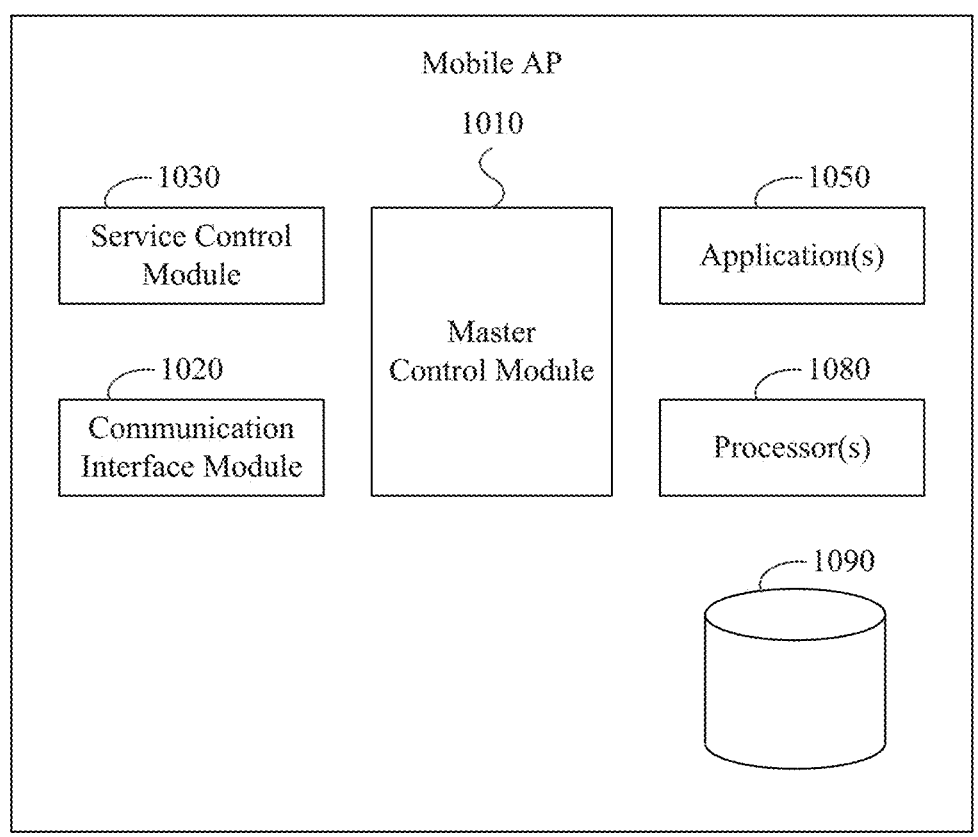
FIG. 10 shows a block diagram of an example mobile access point, in accordance with various aspects of the present disclosure.

FIG. 10 shows a block diagram of an example mobile access point, in accordance with various aspects of the present disclosure. The example Mobile AP 1000 may, for example, share any or all characteristics with the other example methods, nodes, networks, and/or network components 100-900, 1100 and 1200, discussed herein. For example, any or all of the components of the example Mobile AP 1000 may perform any or all of the method steps presented herein, for example with regard to a Mobile AP. Note that the Mobile AP 1000 may also be referred to herein as an OBU.

The example Mobile AP 1000 may, for example, comprise a Communication Interface Module 1020 that operates to perform any or all of the wireless and/or wired communication functionality for the Mobile AP 1000, many examples of which are provided herein (e.g., communication with Central Service(s) Controllers, communication with Cloud databases, communication with sensors, communication with local service control systems of vehicles or Mobile APs, communication with NCs, communication with Fixed AP nodes, communication with Mobile AP nodes, communication directly with client devices, backhaul or cellular communication, etc.). The Communication OF Module 1020 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc. For example, any of the example communication discussed herein between a Mobile AP and an NC, between a Mobile AP and a Fixed or Mobile AP, between a Mobile AP and a local service control system (or module), between a Mobile AP and a Cloud database, between a Mobile AP and a Central Service(s) Controller, etc., may be performed utilizing the Communication Interface Module 1020.

The example Mobile AP 1000 also comprises a Service Control Module 1030 that, for example, operates to perform any or all of the service control functionality discussed herein (e.g., with regard to the example method 900 of FIG. 9, with regard to the service control functionality discussed herein with regard to FIGS. 7-8 and FIGS. 11-12, etc.). The Service Control Module 1030 may, for example, utilize communication services provided by the Communication Interface Module 1020 to perform various aspects of communication.

The example Mobile AP 1000 may, for example, comprise a Master Control Module 1010 that generally manages operation of the Mobile AP 1000 at a high level. Such Master Control Module 1010 may, for example, comprise various aspects of an operating system for the Mobile AP 1000.

The example Mobile AP 1000 may further, for example, comprise one or more Applications 1050 executing on the Mobile AP 1000 (e.g., service control applications, sensor interface applications, client management applications, security applications, power management applications, vehicle monitoring applications, location services applications, user interface applications, etc.).

The example Mobile AP 1000 may also comprise one or more Processors 1080 and Memory Devices 1090. The Processor(s) 1080 may, for example, comprise any of a variety of processor characteristics. For example, the Processor(s) 1180 may comprise one or more of a general purpose processor, RIS processor, microcontroller, ASIC, DSP, video processor, co-processor, etc. The Memory Device(s) 1090 may, for example comprise any of a variety of memory characteristics. For example, the Memory Device(s) 1090 may comprise a volatile memory, non-volatile memory, etc. The Memory Device(s) 1090 may, for example, comprise a non-transitory computer-readable medium that comprises software instructions that when executed by the Processor(s) 1080, cause the Mobile AP 1000 to perform any or all of the functionality discussed herein (e.g., service control functionality, sensor interface functionality, mobility management functionality, communication functionality, etc.).

Note that the example Mobile AP 1000 may also be a Fixed AP 1000 (or base station), in which case, the modules operate to perform any or all of the functionality discussed herein with regard to Fixed APs and/or base stations. Also note that the example Mobile AP 1000 may be implemented in any of the communication network nodes discussed herein (e.g., Cloud nodes, backbone network nodes, vehicle network nodes, client or user devices, etc.).

Various aspects of the present disclosure generally concern operation of one or more nodes of a communication network (e.g., a Central Service Controller, a Cloud server, a Cloud database, etc.). Various examples of such operation will now be presented in the context of an example method that may be implemented in a Central Service Controller (e.g., implemented in a Cloud-based server or computing system), but the scope of this disclosure is not limited thereto. For example, any or all of the aspects may be performed in any of the communication network nodes discussed herein, autonomously or in a distributed manner among a plurality of such nodes (e.g., in one or more Network Controller nodes, in one or more Fixed APs, in one or more Mobile APs, in one or more client or user devices, any combination of such nodes, etc.).

Figure 11:
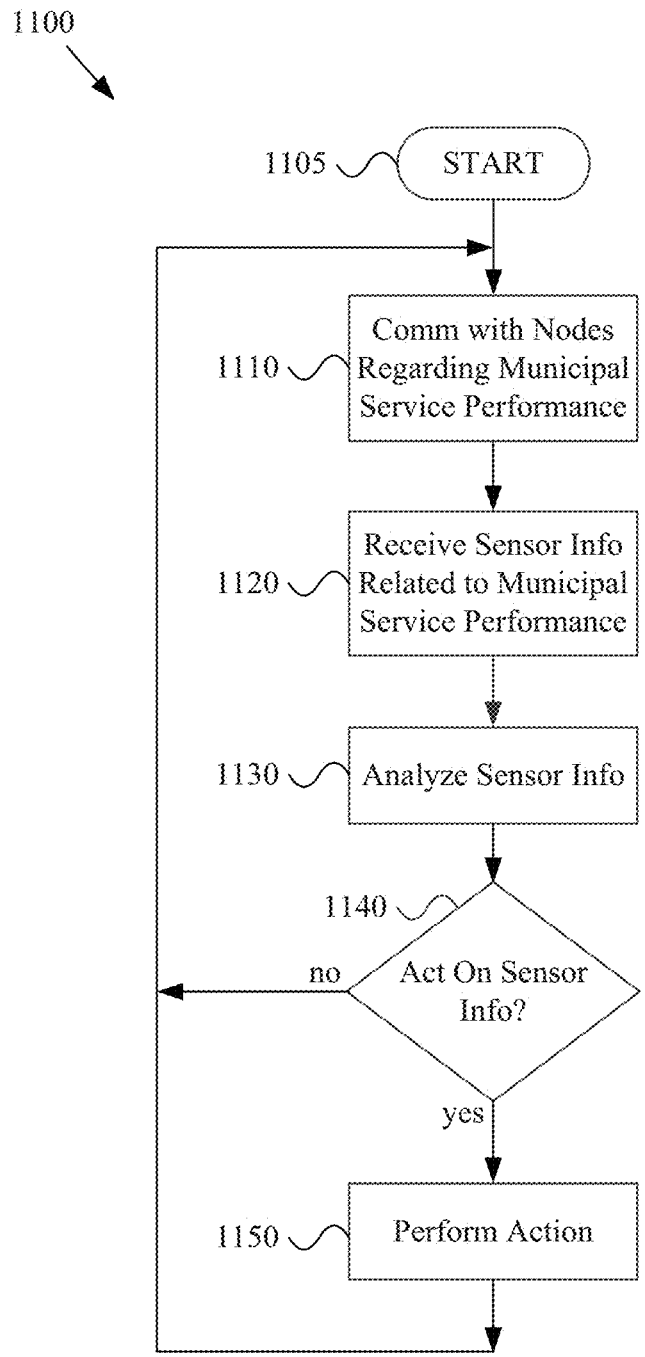
FIG. 11 shows a flow diagram of an example method of managing environmental services, in accordance with various aspects of the present disclosure.

FIG. 11 shows a flow diagram of an example method 11 of managing environmental services (e.g., municipal services, campus services, port services, etc.), in accordance with various aspects of the present disclosure. The example method 1100 may, for example, share any or all characteristics with the other example methods, nodes, networks, and/or network components 100, 200, 300, 400, 500-570, 600, 700, 800, 900, 1000, and 1200, shown and/or discussed herein. The example method 1100, or any portion thereof, may for example be implemented in a Central Service(s) Controller. Also for example, the example method 1100 or any portion thereof may, for example, be implemented in a network database, a networked server, a Network Controller, a Fixed AP, a Mobile AP, any node discussed herein, etc.

The example method 1100 begins executing at block 1105. The example method 1100 may begin executing in response to any of a variety of causes or conditions, non-limiting examples of which are provided herein. For example, the example method 1100 may begin executing in response to a user command to begin, in response to a signal received from a network node (e.g., from a networked database, from a local service controller of a vehicle or MAP thereof, from a client dashboard or control panel, etc.), in response to a detected environmental or municipal service condition (e.g., a waste collection condition, a road service condition, etc.), in response to a detected emergency condition, in response to a timer, in response to a power-up (or turn on or reset) event at a system implementing any or all aspects of the example method 1100, etc.

At block 1110, the example method 1100 comprises communicating with one or more communication network nodes (e.g., root nodes, leaf nodes, intermediate nodes, vehicle network nodes, Mobile APs, Fixed APs, Network Controllers, backbone communication network nodes, Cloud-based databases, sensors, etc.) regarding one or more services being provided (e.g., waste management services, road repair services, collection and/or delivery services, transportation services, etc.) or related conditions. As discussed herein (e.g., with regard to FIG. 9, FIGS. 7-8, FIGS. 1-6, etc.), such communication may comprise communicating information regarding sensor data (e.g., receiving sensor data, directing the collection of sensor data, etc.). Many non-limiting examples of such information have been provided herein.

Such communication may comprise any of a variety of characteristics. For example, block 1110 may comprise a Central Service(s) Controller (or other node) communicating information to a Mobile AP concerning how the Mobile AP is to conduct data collection activities (e.g., data collection control information). For example, such information may comprise information concerning sensors with which the Mobile AP is to communicate to obtain sensor information (e.g., sensor geographical location, sensor network address, sensor type, etc.). Also for example, such information may comprise information identifying when the Mobile AP is to collect (or gather) data from various sensors. Additionally, for example, such information may comprise information regarding the manner in which the Mobile AP is to communicate collected data to the Central Service(s) Controller (or database(s) accessed thereby). For example, such information may indicate whether data collected from a sensor is to be communicated immediately (e.g., via a cellular network, via the vehicle network, etc.), whether the data is to be communicated within a particular amount of time (e.g., within a number of seconds, within a number of minutes, etc.), whether the data has a higher priority than other data, etc.

The information communicated by the Central Service(s) Controller (or other node) may also, for example, comprise service providing command information. A Central Service(s) Controller may, for example, communicate control commands to local service providing vehicles (or Mobile APs thereof), for example to a waste collection vehicle, a road service vehicle, etc. Such commands may, for example, be originated by the Central Service(s) Controller and communicated through one or more Mobile APs and/or Fixed APs. In an example scenario, a Central Service(s) Controller may communicate a "collect" command through a Mobile AP that is within communication range of a waste collection vehicle (or Mobile AP thereof) capable of implementing the "collect." In another example scenario, the Central Service(s) Controller may communicate a "no collect" command for a particular waste collection vehicle to the vehicle communication network, which then has the responsibility to propagate the command to the particular waste collection vehicle(s) through one or access points (e.g., FAPs, MAPs, etc.) that are geographically close to the particular waste collection vehicle.

In general, block 1110 may comprise communicating with one or more communication network nodes regarding one or more services being provided or related conditions. Accordingly, the scope of this disclosure should not be limited by characteristics of any particular service being provided and/or related conditions, or by characteristics of any particular manner of performing such communicating.

The example method 1100 may, at block 1120, comprise receiving (e.g., at a Central Service(s) Controller or other node), sensor information related to one or more services (e.g., municipal services, etc.) being performed. For example, block 1120 may comprise receiving such sensor information from a Mobile AP (or other node) collecting sensor data as the Mobile AP (or vehicle carrying the Mobile AP) travels along a route. Note that the route may be predefined (e.g., a bus route, mail collection route, etc.), partially defined (e.g., a police patrol beat, etc.), generally random, etc. In an example scenario, the Central Service(s) Controller (or other node) may have provided information regarding the route (e.g., a waste collection plan, a bus route, a road maintenance plan, etc.) and/or sensors along the route to the Mobile AP (or vehicle or operator thereof) at block 1110.

For example, as a Mobile AP (or other node) travels along a route, the Mobile AP may operate to collect sensor data from sensors along the route. Some or all of the sensors may, for example, have been identified by the Central Service(s) Controller at block 1110. In an example scenario, at block 1110 the Central Service(s) Controller may have communicated to the Mobile AP a list of secure sensors from which the Mobile AP is to collect data, where the list includes geographical locations of the sensors, security codes for the sensors, operation characteristics (e.g., sleep mode characteristics, communication protocol characteristics, etc.) for the sensors, instructions for how to handle data gathered from the sensors, etc. As a Mobile AP gathers data from one or more sensors, the Central Service(s) Controller (or other node) may receive the sensor data (or information related to the sensor data, for example raw sensor data, summarized sensor data, calculated metrics, etc.) at block 1120. Note that, as discussed herein, the communication of information may be performed immediately in real-time, in a delay tolerant manner, via one or more databases, etc.

At block 1130, the example method 1100 may comprise analyzing the received sensor information, for example to determine whether to perform one or more actions related to the received information. Such actions may comprise any of a variety of characteristics.

For example, block 1130 may comprise analyzing the received information to determine whether a service plan (e.g., a waste collection plan, a road repair plan, etc.) of a vehicle carrying the Mobile AP (or other vehicle) should be immediately modified. In an example scenario, the Mobile AP may be carried by a vehicle that is providing a service to which the collected sensor is related. For example, the Mobile AP may be carried by a waste collection vehicle engaged in waste collection activities, and the collected sensor data may be from sensor indicating amount of waste bin fullness. The Central Service(s) Controller, having received the sensor data (or information related to the sensor data) from the Mobile AP, may analyze such data (or information) to determine whether the present service providing plan guiding operation of the vehicle (and crew thereof) should be modified. For example, as discussed herein, an unexpected situation (e.g., a waste bin that is unexpectedly in need of urgent service) may arise while the vehicle is performing its service-providing duty according to a predefined service providing plan (e.g., which may have communicated at block 1110). In response to information related to sensor data indicating that the waste bin is urgently in need of servicing, the Central Service(s) Controller may determine that the service providing plan should immediately be altered. Such a decision may, for example, be based at least in part on the sensor data level (e.g., relative to a threshold, analyzed in light of statistical expectations (e.g., averages, standard deviations or variances, etc.), time-of-day, day-of-week, geographical location, the location of the waste bin relative to the vehicle and/or the vehicle's planned route, etc.). Similarly, the Central Service(s) Controller may determine that a service providing plan of a vehicle different from the vehicle carrying the Mobile AP should be modified. For example, as explained herein, a vehicle independent of (e.g., entirely unrelated to, etc.) the service being provided may provide the sensor information being analyzed by the Central Service(s) Controller to control the providing of the service.

Block 1130 may also, for example, comprise analyzing the received sensor information and determining that the received sensor information will be considered when the next service providing plan is developed (e.g., for a next day, next shift, next route, etc.), for example rather than immediately modifying a service providing plan for a vehicle that is currently in the field.

Block 1130 may additionally, for example, comprise analyzing the received sensor information and determining that the sensor originating the received sensor information (or related sensor data) should be monitored more frequently. In such an example scenario, block 1130 may comprise communicating a command to one or more other nodes (e.g., Mobile APs, etc.) to communicate with the sensor whenever the opportunity arises (e.g., when Mobile APs are passing by and within range of the sensor, etc.).

Other example actions that may be taken by the Central Service(s) Controller (or other node) may, for example, comprise alerting a client system associated with the particular service of a detected condition and/or of a modification to a service plan, alerting a user (e.g., a driver or controller of a vehicle, a dispatcher, etc.) of a detected environmental condition, communicating to the sensor (and/or a customer associated with the sensor) that the sensor data has been received and/or successfully reported, communicating to a customer associated with the sensor an estimate of when a service call related to the sensor may be performed (e.g., a scheduled time of waste pick-up, etc.) etc.

In general, block 1130 may comprise analyzing the received sensor information, for example to determine whether to perform one or more actions related to the received information. Accordingly, the scope of the present disclosure is not limited by characteristics of any particular action, manner of determining whether to perform an action, etc.

The example method 1100 may, at block 1140, comprise directing execution flow of the example method 1100. If it is determined at block 1130 that no action is to be taken based on the analysis formed at block 1130, then block 1140 directs execution flow of the example method 1100 back up to block 1110 (or any block of the example method 1100 or any step of any method discussed herein). If it is determined at block 1130 that one or more actions are to be taken based on the analysis formed at block 1130, then block 1140 directs execution flow of the example method 1100 to block 1150 for performance of the action(s). After block 1150, execution of the example method 1100 flows back up to block 1110 (or any block of the example method 1100 or any step of any method discussed herein).

Figure 12:
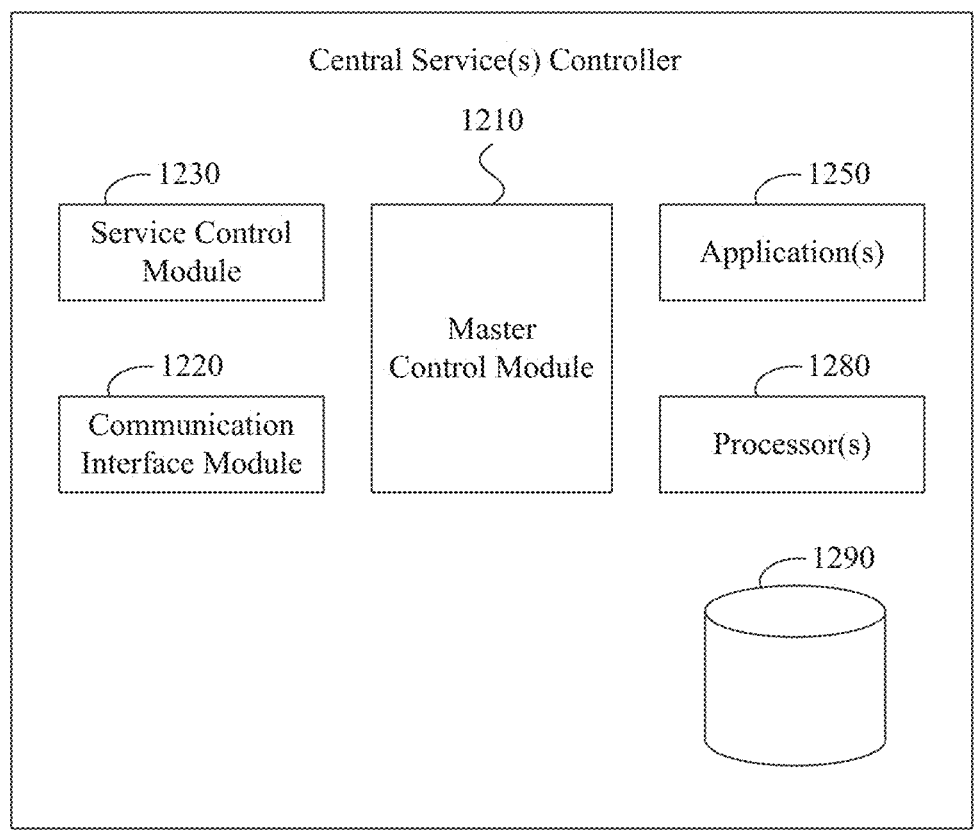
FIG. 12 shows a block diagram of an example central service controller, in accordance with various aspects of the present disclosure.

FIG. 12 shows a block diagram of various components of an example Central Service(s) Controller (CSC), in accordance with various aspects of the present disclosure. The example CSC 1200 may, for example, share any or all characteristics with the other example methods, nodes, networks, and/or network components 100-1100, discussed herein. For example, any or all of the components of the example Central Service(s) Controller 1200 may perform any or all of the method steps presented herein. Although the CSC 1200 is presented here in the context of a central (e.g., cloud-based) controller, it should be understood that any or all aspects of the example CSC 1200 may be implemented in any (or any combination) of the nodes discussed herein. For example, in an example implementation, the CSC 1200 may be implemented in a distributed manner among the Mobile APs and/or Fixed APs of the vehicle network.

The example CSC 1200 may, for example, comprise a Communication Interface Module 1220 that operates to perform any or all of the wireless and/or wired communication functionality for the CSC 1200, many examples of which are provided herein (e.g., communication with databases, communication with local traffic control systems, communication with fleet controllers, communication with Fixed AP nodes, communication with Mobile AP nodes, communication with cellular (or other) base stations, landline communication, communication with the Cloud APIs or other entities, backhaul communication, communication with client dashboards or controllers, etc.). The Communication I/F Module 1220 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), POTS communication, etc. For example, any of the example communication discussed herein between a CSC and a Mobile AP, between a CSC and a Fixed AP, between a CSC and a backhaul network, between a CSC and a local service controller, etc., may be performed utilizing the Communication I/F Module 1220.

The example CSC 1200 also comprises a Service Control Module 1230 that, for example, performs any or all of the traffic control functionality discussed herein (e.g., with regard to the example method 1100 of FIG. 11, with regard to the service control functionality discussed with regard to FIGS. 7-10, etc.). The Service Control Module 1230 may, for example, utilize communication services provided by the Communication Interface Module 1220 to perform various aspects of communication.

The example CSC 1200 may, for example, comprise a Master Control Module 1210 that generally manages operation of the CSC 1200 at a high level. Such Master Control Module 1210 may, for example, comprise various aspects of an operating system for the CSC 1200.

The example CSC 1200 may further, for example, comprise one or more Applications 1250 executing on the CSC 1200 (e.g., waste collection control applications, road maintenance control applications, mass transit control applications, traffic control applications, client management applications, security applications, power management applications, vehicle monitoring applications, location services applications, user interface applications, etc.).

The example CSC 1200 may also comprise one or more Processors 1280 and Memory Devices 1290. The Processor(s) 1280 may, for example, comprise any of a variety of processor characteristics. For example, the Processor(s) 1280 may comprise one or more of a general purposes processor, RIS processor, microcontroller, ASIC, DSP, video processor, co-processor, etc.). The Memory Device(s) 1290 may, for example comprise any of a variety of memory characteristics. For example, the Memory Device(s) 1290 may comprise a volatile memory, non-volatile memory, etc. The Memory Device(s) 1290 may, for example, comprise a non-transitory computer-readable medium that comprises software instructions that when executed by the Processor(s) 1280, cause the CSC 1200 to perform any or all of the functionality discussed herein (e.g., service control functionality, mobility management functionality, communication functionality, etc.).

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for environmental management in a network of moving things. As non-limiting examples, various aspects of this disclosure provide systems and methods for integrating sensors, mobile access points, and/or the network of moving things with municipal waste management systems, pollution control systems, etc. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A mobile access point (MAP) for use in a vehicle communication network, the MAP comprising:

at least one wireless transceiver; and at least one module comprising a processor and memory, wherein the at least one module is operable to, at least, while the MAP is on-board a moving vehicle:

utilize the at least one wireless transceiver to provide general-purpose wireless local area network (WLAN) services to user devices within wireless range of the at least one wireless transceiver, the general-purpose WLAN services comprising WLAN communication services unrelated to waste management;

utilize the at least one wireless transceiver to establish communication links directly with other peer mobile access points, where each of the other peer mobile access points is on-board a respective vehicle;

utilize the at least one wireless transceiver of the MAP to establish communication links directly with waste container sensors positioned along a travel route of the moving vehicle that the MAP is on-board;

collect waste management-related sensor data from the sensors; and utilize the at least one wireless transceiver to communicate information related to the collected waste management-related sensor data to a second system via the vehicle communication network, wherein the at least one module is operable to:

receive first data collection control information, the first data collection control information comprising a list of sensors along the travel route of the moving vehicle that the MAP is on-board and from which the MAP is to collect sensor information; and while the MAP is traveling on the travel route:

receive second data collection control information; and adjust the list of sensors from which the MAP is to collect sensor information based, at least in part, on the received second data collection control information.

2. The mobile access point of claim 1, wherein the MAP is mechanically coupled to a vehicle that is unrelated to waste management.

3. The mobile access point of claim 1, wherein the MAP is mechanically coupled to a mail service vehicle.

4. The mobile access point of claim 1, wherein:
the vehicle comprises a public transportation vehicle; and
the at least one module is operable to provide general-purpose wireless communication services to passengers of the public transportation vehicle, the general-purpose wireless communication services comprising Internet access.

5. The mobile access point of claim 1, wherein the second system comprises a central controller and/or a central database.

6. The mobile access point of claim 1, wherein the second system comprises a peer mobile access point like the mobile access point and on-board another moving vehicle.

7. The mobile access point of claim 1, wherein the at least one module is operable to, after collecting the waste management-related sensor data, determine at least one of a plurality of manners in which to communicate the information to the second system, the plurality of manners comprising a real-time communication manner and a delay tolerant communication manner.

8. The mobile access point of claim 7, wherein the plurality of manners comprises:
a first manner comprising immediately communicating the information to the second system in the Cloud via a first type of metropolitan area network; and
a second manner comprising communicating the information to the second system in a delay tolerant manner via a second type of metropolitan area network.

9. The mobile access point of claim 7, wherein the at least one module is operable to determine whether to communicate the information to the second system in a real-time communication manner or in a delay tolerant communication manner based, at least in part, on a value of the collected waste management-related sensor data.

10. The mobile access point of claim 7, wherein the at least one module is operable to identify a network via which to communicate the information related to the collected waste management-related sensor data to the second system based, at least in part, on time-of-day and/or day-of-week.

11. The mobile access point of claim 7, wherein the at least one module is operable to:
determine a priority of the information; and
select between the plurality of manners in which to communicate the information to the second system based, at least in part, on the determined priority.

12. The mobile access point of claim 1, wherein the at least one module is operable to, after collecting the waste management-related sensor data from the sensors, determine at least one of a plurality of manners in which to communicate the information to the second system, wherein the plurality of manners comprises:
a first manner comprising communicating the information to the second system via a vehicle communication network; and
a second manner comprising communicating the information to the second system via a cellular communication network.

13. A mobile access point (MAP) for use in a vehicle communication network, the MAP comprising:
at least one wireless transceiver; and
at least one module comprising a processor and memory, wherein the at least one module is operable to, at least, while the MAP is on-board a moving vehicle:
utilize the at least one wireless transceiver to provide general-purpose wireless local area network (WLAN) services to personal electronic devices within wireless range of the at least one wireless transceiver, the general-purpose WLAN services comprising WLAN communication services unrelated to waste management;
utilize the at least one wireless transceiver to establish communication links directly with other peer mobile access points, where each of the other peer mobile access points is on-board a respective vehicle;
utilize the at least one wireless transceiver of the MAP to establish communication links directly with sensors positioned along a travel route of the moving vehicle that the MAP is on-board;
collect waste management-related sensor data from the sensors; and
analyze the collected waste management-related sensor data to identify at least one action to perform,
wherein the at least one module is operable to, after collecting the waste management-related sensor data, analyze the collected waste management-related sensor data to determine at least one of a plurality of manners in which to communicate the collected waste management-related sensor data to a second system, the plurality of manners comprising a real-time communication manner and a delay tolerant communication manner.

14. The mobile access point of claim 13, wherein the at least one module is operable to, after collecting the waste management-related sensor data, analyze the collected waste management-related sensor data to determine at least one of a plurality of available manners in which to communicate the collected waste management-related sensor data to a second system, the plurality of manners comprising a real-time communication manner and a delay tolerant communication manner.

15. The mobile access point of claim 13, wherein the at least one module is operable to analyze the collected waste management-related sensor data to determine whether to modify a waste collection plan.

16. The mobile access point of claim 15, wherein the at least one module is operable to:
receive a waste collection plan prior to collecting the waste management-related sensor data from the sensors; and
modify the waste collection plan in real-time while the mobile access point is moving based, at least in part, on the collected waste management-related sensor data.

17. The mobile access point of claim 16, wherein the at least one module is operable to determine to modify the waste collection plan autonomously.

18. The mobile access point of claim 16, wherein the at least one module is operable to determine whether to modify the waste collection plan in real-time based, at least in part, on comparison of the collected waste management-related sensor data with a threshold value.

19. The mobile access point of claim 16, wherein the at least one module is operable to communicate information regarding the modified waste collection plan to a second system.

20. The mobile access point of claim 16, wherein the received waste collection plan is based, at least in part, on waste management-related sensor data previously collected from the sensors.

21. A mobile access point (MAP) for use in a vehicle communication network, the MAP comprising:
at least one wireless transceiver; and
at least one module comprising a processor and memory, wherein the at least one module is operable to, at least, while the MAP is on-board a moving vehicle:
utilize the at least one wireless transceiver to provide general-purpose wireless local area network (WLAN) services to user devices within wireless range of the at least one wireless transceiver, the general-purpose WLAN services comprising WLAN communication services unrelated to municipal services;
utilize the at least one wireless transceiver to establish communication links directly with other peer mobile access points, where each of the other peer mobile access points is on-board a respective vehicle;
utilize the at least one wireless transceiver of the MAP to establish communication links directly with sensors positioned along a travel route of the moving vehicle that the MAP is on-board;
collect municipal service-related sensor data from the sensors; and
utilize the at least one wireless transceiver to communicate information related to the collected municipal service-related sensor data to a second system via the vehicle communication network,
wherein the at least one module is operable to:
receive first data collection control information, the first data collection control information comprising a list of sensors along the travel route of the moving vehicle that the MAP is on-board and from which the MAP is to collect sensor information; and
while the MAP is traveling on the travel route:
receive second data collection control information; and
adjust the list of sensors from which the MAP is to collect sensor information based, at least in part, on the received second data collection control information.

22. The mobile access point of claim 21, wherein the at least one module is operable to utilize the at least one wireless transceiver to communicate the information related to the collected municipal service-related sensor data to the other peer mobile access points.

23. The mobile access point of claim 21, wherein the MAP is mechanically coupled to a vehicle that is unrelated to a municipal service corresponding to the collected municipal service-related sensor data.

24. The mobile access point of claim 21, wherein the second system comprises another mobile access point like the mobile access point and on-board another moving vehicle.

25. The mobile access point of claim 21, wherein the at least one module is operable to, after collecting the municipal service-related sensor data, determine at least one of a plurality of manners in which to communicate the information to the second system, the plurality of manners comprising a real-time communication manner and a delay tolerant communication manner.

26. The mobile access point of claim 21, wherein the moving vehicle comprises a public transportation vehicle.

* * * * *